July 10, 1962

J. C. LOUTON, JR., ET AL 3,043,551

VEHICLE SEAT

Filed Oct. 28, 1957

INVENTORS
James C. Louton, Jr. &
Clyde H. Schamel
BY W. S. Pettigrew
ATTORNEY

INVENTORS
James C. Louton, Jr. &
Clyde H. Schamel
BY W. S. Pettigrew
ATTORNEY

July 10, 1962 J. C. LOUTON, JR., ET AL 3,043,551
VEHICLE SEAT
Filed Oct. 28, 1957 6 Sheets-Sheet 4

INVENTORS
James C. Louton, Jr. &
Clyde H. Schamel
BY
W. S. Pettigrew
ATTORNEY

July 10, 1962 J. C. LOUTON, JR., ET AL 3,043,551
VEHICLE SEAT
Filed Oct. 28, 1957 6 Sheets-Sheet 5

INVENTORS
James C. Louton, Jr. &
Clyde H. Schamel
BY W. S. Pettigrew
ATTORNEY

July 10, 1962  J. C. LOUTON, JR., ET AL  3,043,551
VEHICLE SEAT
Filed Oct. 28, 1957  6 Sheets-Sheet 6
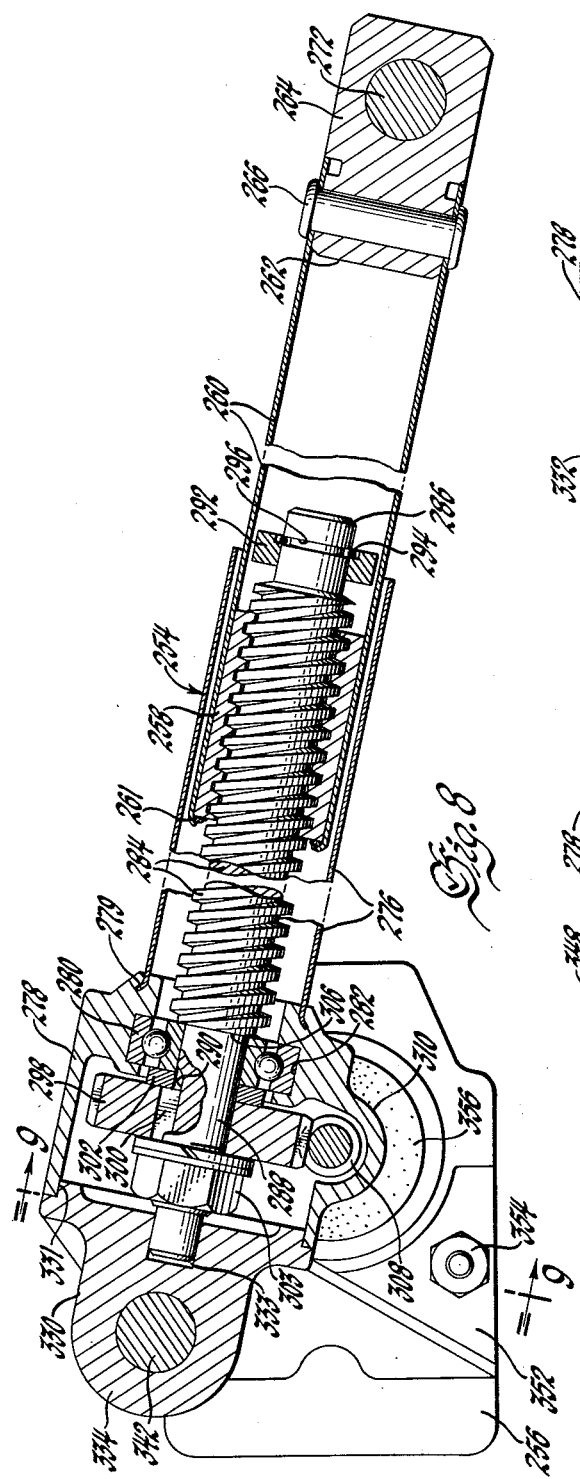
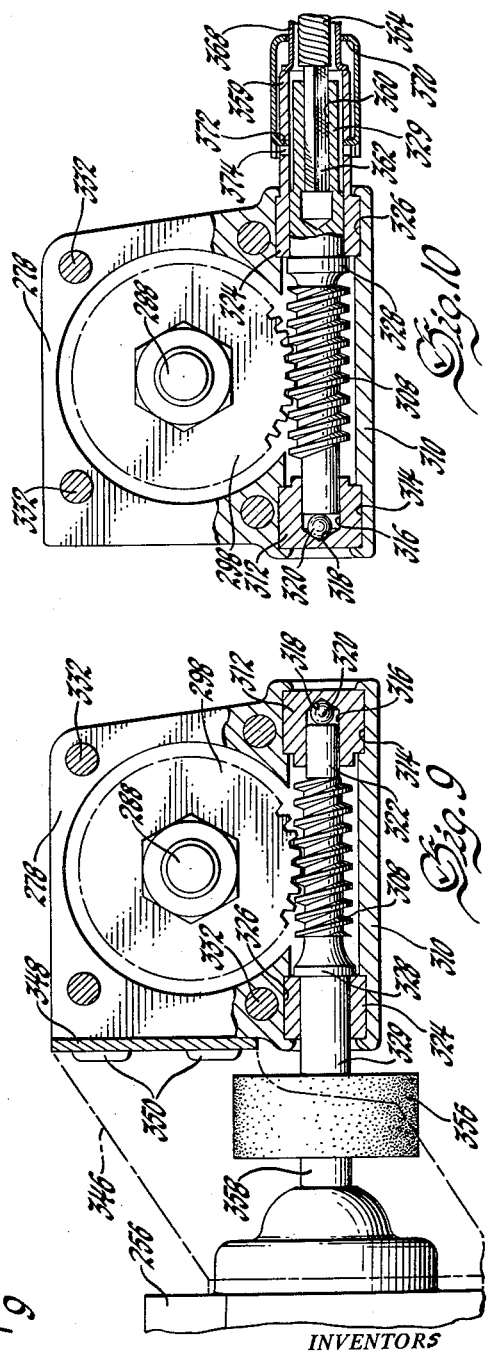
INVENTORS
James C. Louton, Jr. &
Clyde H. Schamel
BY W. S. Pettigrew
ATTORNEY United States Patent Office 3,043,551
Patented July 10, 1962

1

3,043,551
VEHICLE SEAT
James C. Louton, Jr., Hazel Park, and Clyde H. Schamel, Royal Oak, Mich., assignors to General Motors Corporation, Detroit, Mich., a corporation of Delaware
Filed Oct. 28, 1957, Ser. No. 692,836
11 Claims. (Cl. 248—404)

This invention relates to vehicle seats and more particularly to vehicle seat adjusting means for adjusting a vehicle seat in both horizontal and vertical directions.

The vehicle seat adjusting means of this invention is power operated for movement in both horizontal and vertical directions and is of the six way type, in that it is operative to adjust the seat in horizontal forward and rearward directions and is operative to adjust the front and rear edge portions of the seat selectively and independently of each other.

One feature of the vehicle seat adjusting means of this invention lies in the vertical adjusting means which comprise adjustable screw jacks. A pair of longitudinally spaced forward and rearward screw jacks is provided for each adjuster at each side of the seat, with each screw jack being swingably mounted on the base support and being swingably secured to the seat slide structure of each adjuster which supports the seat. The screw jacks are of a novel construction and compression springs between the screw jacks and the seat slide structure exert a constant force, regardless of the angularity between the screw jacks and the slide structure, to assist vertically upward adjustment of the seat slide structure and to prevent any vertical shifting movement of the slide structure independently of the screw jacks when the seat is stationary or is being vertically adjusted.

Another feature of this invention lies in the arrangement of the axes of swinging of the screw jacks relative to the seat slide structure and to the base support. Each of the screw jacks at each side of the seat is pivotally connected to the seat slide structure for swinging movement about an axis which is transverse of the seat and vehicle body. Each of the forward transverse pairs of screw jacks is pivotally connected to the base support for swinging movement about a like axis while each of the rearward transverse pairs of screw jacks is pivotally connected to the base support for swinging about an axis which is longitudinal of the seat and vehicle body and normal to the other axes of swinging. By arranging the forward and rearward screw jacks in this manner at each side of the seat, both lateral and longitudinal seat stability are provide to prevent longitudinal and lateral seat sway.

A further feature of the invention is in the arrangement of the power operating means for driving the front and rear transverse pairs of screw jacks. An electric motor is provided for each transverse pair of screw jacks, with the motor for the front transverse pair being located between the seat slide structure and the base support of one adjuster at one side of the seat and the motor for the rear transverse pair being located between the seat slide structure and the base support of the other adjuster at the other side of the seat. This conserves foot room under the seat for rear seat passengers. The front and rear transverse pairs of screw jacks are each connected by a flexible cable drive means and the motor for each pair is connected to this flexible drive means through a torque limiting coupling such that whenever either of the screw jacks of the pairs binds or becomes obstructed in any manner, the torque limiting coupling prevents further operation of the cable drive means whereby there is no further adjustment of the screw jack which is not binding or is not obstructed. Thus, the seat cannot be tilted transversely thereof from one side to the other. This latter condition could very

2 easily happen if one screw jack of one of the pairs was further adjusted after the other screw jack of the pair became obstructed or became bound.

Yet another feature of the seat of this invention is in the horizontal adjusting means which comprise adjustable screw jacks interconnected between each of the seat base supports and each of the upper track members of the seat slide structures. One of the screw jacks is directly driven by an electric motor and a flexible cable interconnects the motor with the other of the screw jacks.

Yet a further feature of this invention is in the seat slide structure and particularly in the seat slides between the upper and lower tracks which slidably support the upper track on the lower track. In the past it has been conventional to employ ball and roller bearings for this purpose. However, certain disadvantages often occur in the use of ball and roller bearings, particularly since the bearings are often harder than the tracks so as to cause undue wear and brinnelling of the tracks. In the seat slide structure of this invention, the lower track is provided with longitudinally spaced pairs of Dylan seat slides which are secured to the lower track and slidably support the upper track thereon. Dylan is a trade name for a group of ethylene polymers having the properties of low temperature flexibility and low impact strength, low water absorption, good chemical resistance at ordinary temperatures and very light weight. The Dylan seat slides function over periods of time without lubrication or breakdown and slidably support the upper track on the lower track for very easy sliding movement relative thereto.

The primary object of this invention is to provide a new and improved vehicle seat adjusting means for adjusting a vehicle seat in both horizontal and vertical directions.

This and other objects of this invention will be readily apparent from the following specification and drawings, wherein:

FIGURE 8 is a sectional view of the screw jack of the horizontal adjusting means taken along the plane indicated by line 8—8 of FIGURE 1;

FIGURE 9 is a sectional view taken along the plane indicated by line 9—9 of FIGURE 8; and FIGURE 10 is a sectional view taken along the plane indicated by line 10—10 of FIGURE 1.

Before proceeding with a description of the seat adjusting means of this invention, it will be understood that the right and left hand seat adjusters of the seat adjusting means are substantially the same, although of different hand. Therefore, only the left hand seat adjuster will be particularly described, and it will be understood that the right hand seat adjuster is the same, except as otherwise noted, and that like numerals will be used for like parts of each seat adjuster.

Figure 1:
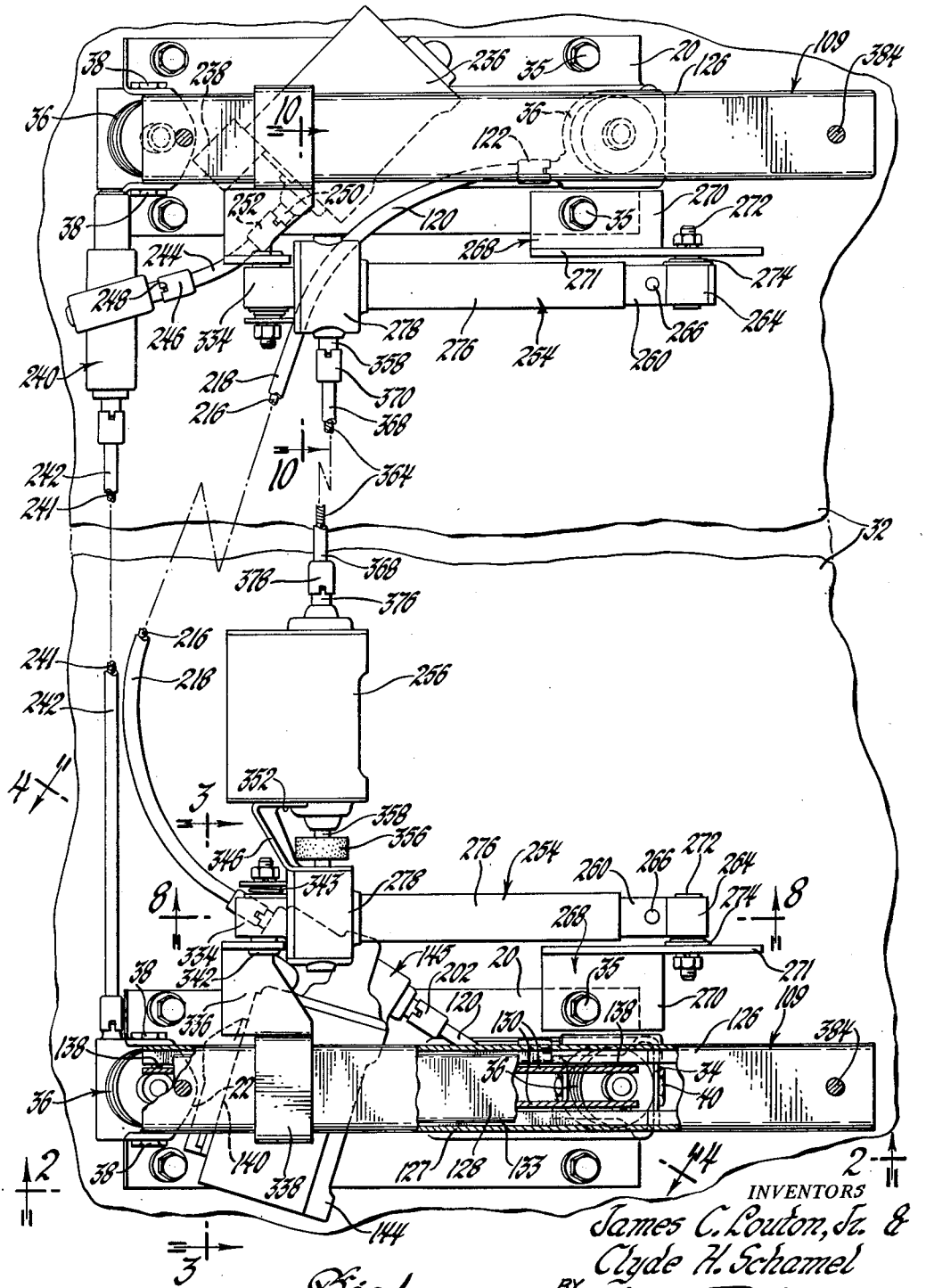
FIGURE 1 is a top plan view, partially broken away of a vehicle seat adjusting means according to this invention taken along the line 1—1 of FIGURE 2.
Figure 2:
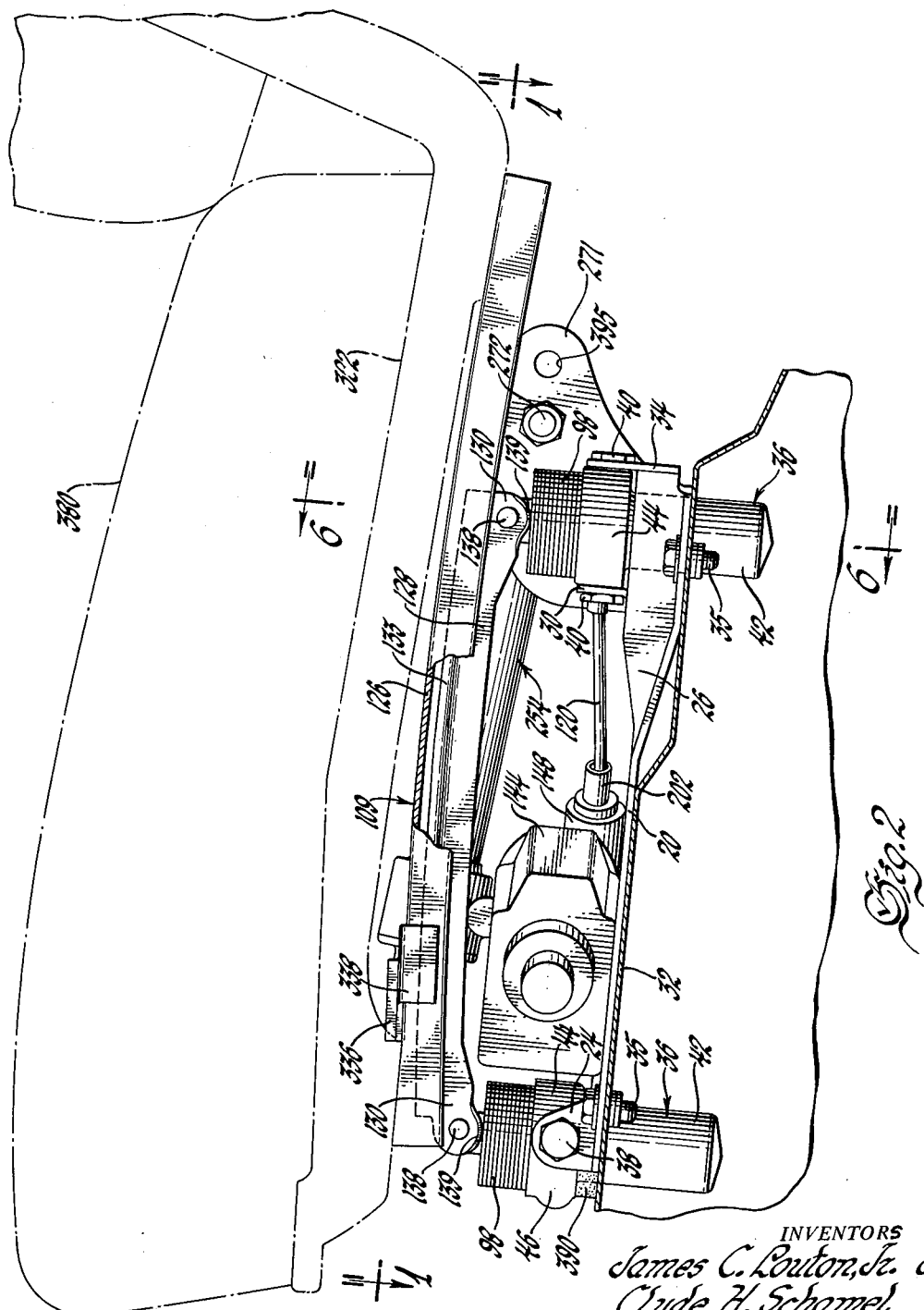
FIGURE 2 is a side elevational view, partially broken away, of the right hand seat adjuster taken along the lines 2—2 of FIGURE 1.
Figure 7A:
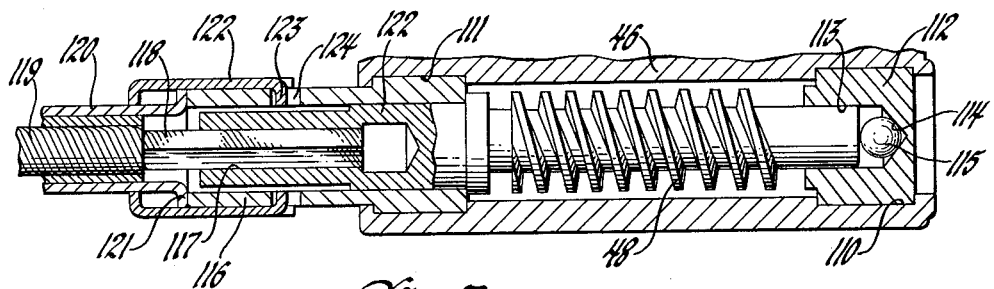
FIGURE 7a is a sectional view taken along the plane indicated by line 7a—7a of FIGURE 7.
Figure 7:
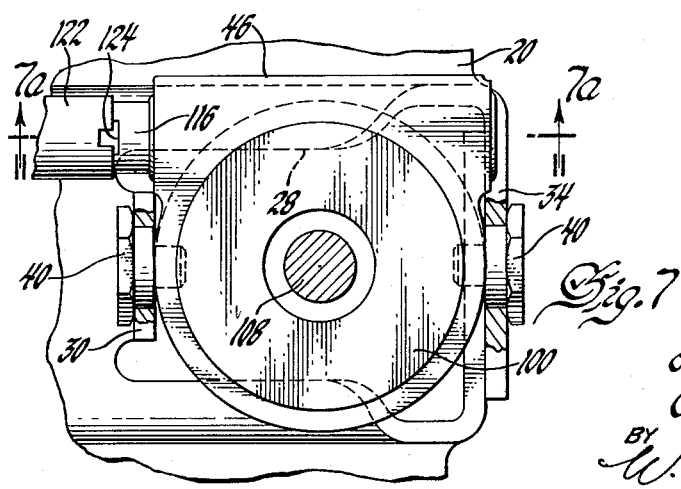
FIGURE 7 is a view taken along the plane indicated by line 7—7 of FIGURE 6.

Referring now particularly to FIGURES 1, 2 and 7 of the drawings, a support bracket 20 includes an opening 22 at the forward end thereof and a pair of apertured upright side lugs 24 which are formed from the material of the opening. The rearward end of the bracket is offset upwardly into a generally U-shaped housing 26 provided with an opening 28. A portion of the material of the opening is bent upwardly to provide an upright apertured forward lug 30 and opposite side walls of the housing are bent inwardly and spot welded together to provide an upright apertured rear lug 34. Bracket 20 is secured to the vehicle floor pan 32 by bolts 35.

A forward screw jack 36 is swingably secured to the lugs 24 by bolts 38 for swinging movement about a horizontal axis which is transverse of the vehicle and transverse of the seat and a like rearward screw jack 36 is swingably secured to lugs 30 and 34 by shouldered bolts 40 for swinging movement about a horizontal axis which is longitudinal of the seat and of the vehicle and which is normal to the axis of swinging of the forward screw jack. By arranging the axes of swinging of the screw jacks at each side of the seat in this manner, both longitudinal and lateral shifting movement of the seat are prevented, as will be more fully described.

Each of the screw jacks is of a like construction, and therefore only the rearward screw jack will be particularly described with reference to FIGURES 6 and 7, and it will be understood that the forward screw jack is of the same construction. Referring now to these figures, the screw jack includes a circular lower housing 42 received within an opening 43 in floor pan 32 and an integral circular upper housing 44 of larger diameter which includes a linear boss 46 rotatably mounting a worm gear 48 in a manner hereinafter described. A tube or casing 50 is provided with an enlarged upper end 52 which receives an internally threaded nut 54. The lower edge of the nut seats against the shoulder 56 of the tube and the upper edge of the tube is flanged over the nut at 58 to secure the nut to the tube for rotation therewith. The lower edge of the tube seats against a circular thrust plate 60 having an upwardly extending circular boss 62 received within the lower end of the tube. The end wall of housing 42 is provided with a bore 64 having a conically shaped lower wall 66. A conically shaped spring washer 68 seats against wall 66 to provide a seat for a thrust bearing 70 which also seats within a circular depression 72 in plate 60.

A bushing 74 fits over tube 50 in engagement with shoulder 56, with the bushing and tube being welded or brazed together at 76. The bushing is provided with a pair of diametrically opposite upwardly extending keys 78, only one of which is shown. A worm wheel 80 is provided with a circular bore having diametrically opposite keyways 82, only one of which is shown, which receive the keys 78 of bushing 74 to slidably and non-rotatably secure the worm wheel to the bushing for rotation of the tube 50 and nut 54 upon rotation of the worm wheel. The worm wheel meshes with the worm 48 and is driven thereby. A flanged bushing 86 seats on the worm wheel and cooperates with a shoulder 88 of housing 44 to provide a seat for a flat washer 90. A split washer 92 bears against washer 90 and snaps within a groove 94 of housing 44 to hold washer 90 in place and hold bushing 86 in engagement with worm wheel 80 to thereby prevent any upward sliding movement of the worm wheel relative to bushing 74. A coiled flat compression spring 98 has one end thereof seating on the split washer 92 and the other end thereof bearing against a flat washer 100.

A lead screw 102 is threadedly received by the nut 54 for axial movement relative thereto upon rotation of the nut. A guide bushing 104 is slidably received on the lower end of the lead screw and is located by a split ring 106 which snaps within a groove 107 in the lead screw. The bushing 104 radially locates screw 102 within the tube 50 whereby the axis of the lead screw always is coaxial with the axis of rotation of nut 54. The upper end of the lead screw terminates in a circular stud 108 of reduced diameter which is secured to the lower track of the seat slide structure 109 in a manner to be hereinafter described.

Referring now particularly to FIGURE 7a of the drawings, the manner in which the worm gear 48 is mounted within boss 46 will be described. The bore of boss 46 is provided with bore portions 110 and 111 of larger diameter at the opposite ends thereof. A bushing 112 fits within bore portion 110 and is secured in place by peening over one end of boss 46 after assembly. The bushing is provided with a circular bore 113 having a conically shaped seat 114 in the base wall thereof. A ball bearing 115 seats on seat 114 and engages the one end of the worm gear 48 received within bore 113 to provide a thrust bearing for the worm. A shouldered bushing 116 is received within bore portion 111 and is secured in place by peening over the other end of boss 46 after assembly. The bushing 116 rotatably mounts and locates the other shouldered end of the worm gear 48 which is provided with a square-shaped bore 117. The square-shaped end 118 of a flexible drive cable 119 is received within bore 117 to couple the drive cable to the worm gear. The drive cable is provided with a protective circular sheath 120 and the flared end 121 of the sheath engages the outer end of bushing 116. A cap 122 fits over the flared end 121 of the sheath and is provided with tangs 123 which snap into opposite diametrically located slots 124 of bushing 116.

Figure 5:
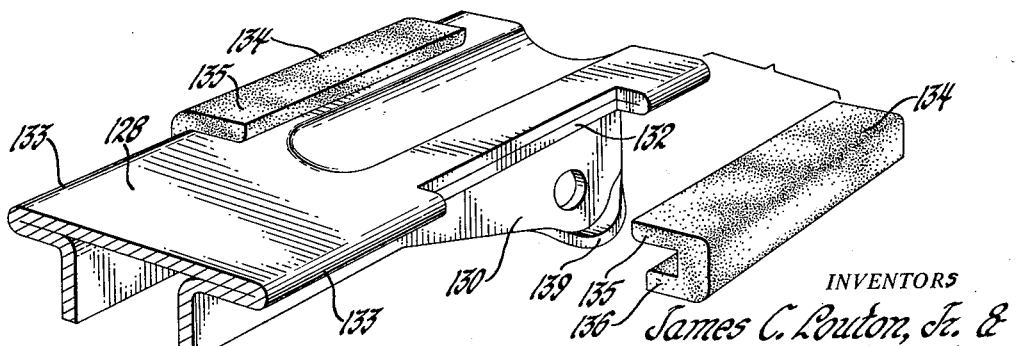
FIGURE 5 is an exploded perspective view of a portion of the lower track member of the seat slide structure and the seat slides which are supported thereon and slidably support the upper track member.
Figure 6:
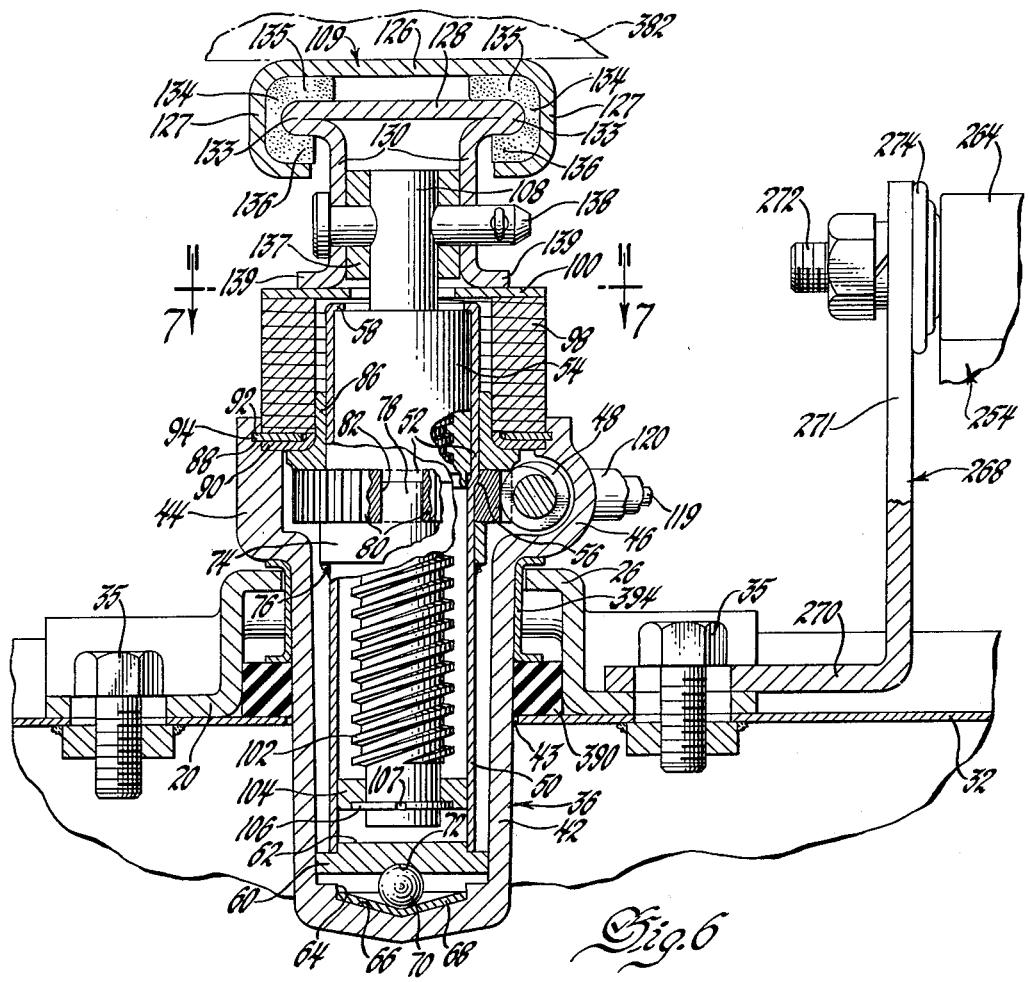
FIGURE 6 is a sectional view of one of the screw jacks of the vertical adjusting means taken along the plane indicated by line 6—6 of FIGURE 2.

Referring now particularly to FIGURES 2, 5 and 6, the seat slide structure 109 will now be described. The seat slide structure includes an upper track 126 of generally C-shape and a lower track 128 of generally enlarged T-shape provided with depending pairs of apertured ears 130 at either end thereof. As best shown in FIGURE 5 of the drawings, a pair of opopsitely opening notches 132 are cut out of the opposite double thickness folded flanges 133 of track 128 above each pair of ears 130. A generally U-shaped slide 134 of Dylan is received within each notch 132, with the ends of the slide engaging opposite sides of the notch to longitudinally locate the slide against shifting and with the upper and lower legs 135 and 136, respectively, of the slide bearing against the upper and lower surfaces of flange 133 adjacent the base of the notch, as best shown in FIGURES 5 and 6. The slides are received within the upper track 126 and conform to the shape of the opposite depending flanged legs 127 thereof to slidably support the upper track on the lower track for sliding movement relative thereto.

As best shown in FIGURE 6 of the drawings, a circular apertured bushing 137 is received between each pair of opposite ears 130 of the lower track and receives stud 108 of the lead screw 102. A pin 138 extends between the apertured ears 130 through aligned apertures in bushing 137 and stud 108 of the lead screw to pivotally secure the lead screw to the lower track for swinging movement relative thereto. Upon reference to FIGURES 5 and 6, it will be noted that each of the ears 130 is provided with a laterally outwardly extending circular flange 139 having a center at the axis of pin 138 and slidably engaging the washer 100.

The operation of the screw jack 36 will now be generally described. Upon rotation of the worm 48, the worm wheel 80 is driven to rotate the tube 50 and the nut 54 and thread the lead screw into and out of the nut depending on the direction of rotation of the tube and nut. If the lead screw is threaded out of the nut so as to raise one end of the seat slide structure 109, the compression spring 98 which seats on the screw jack housing 44 and bears against washer 100 acts as an assist spring to aid the screw jack in raising the seat. If one end of the slide structure is vertically adjusted independently of the other end, then there will be some rotational movement of the lower track 128 relative to the lead screw about pin 138. During this rotational movement the flanges 139 rotate relative to the washer 100, and since the flanges have a center at the axis of pin 138, the spring 98 will exert a constant assist force during any rotational movement of the lower track relative to the lead screw. Thus, by providing the arcuate flanges 139, the spring 98 exerts a constant force on the lower track regardless of the angular relationship of the lead screw relative to the lower track. Additionally, the spring aids seat stability by preventing any relative shifting movement between the lead screw and the lower track should the pin 138 be able to shift relative to stud 108 or ears 130.

Figure 3:
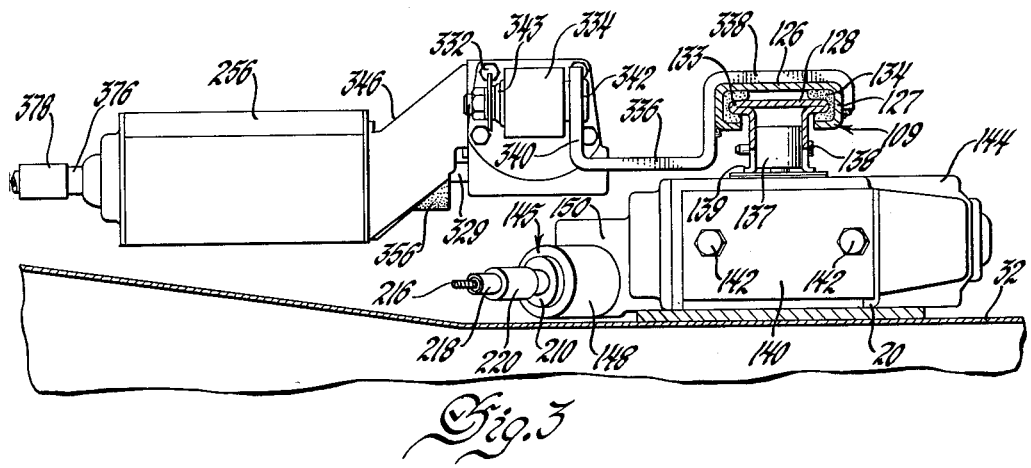
FIGURE 3 is a front elevational view of the right hand seat adjuster taken along the lines 3—3 of FIGURE 1.
Figure 4:
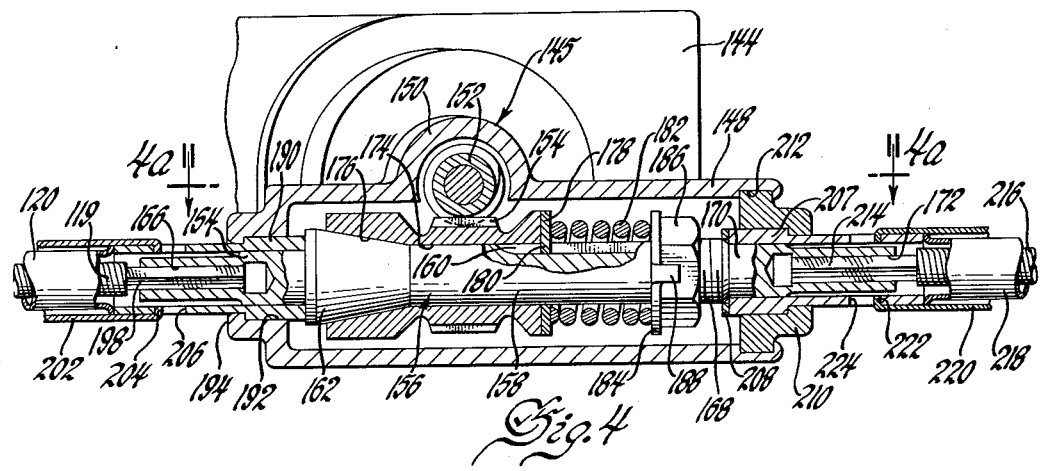
FIGURE 4 is a sectional view taken along the plane indicated by line 4—4 of FIGURE 1.

Referring now particularly to FIGURES 1, 3 and 4, the power operating means for the rear pair of screw jacks 36 will be described. An angle bracket 140 has one leg thereof welded or otherwise secured to the bracket 20 and the other leg thereof bolted at 142 to an electric motor 144 which is located transverse of the slide structure 109 between the lower track 128 thereof and bracket 20, as can be best seen in FIGURES 1 and 3. A torque overload coupling 145 includes a lower circular housing 148 and an integral upper circular housing 150 opening thereto and secured in a suitable manner to motor 144, with the axis of the upper housing 150 being located angular and transverse to the axis of the lower housing 148. A worm 152 is rotatably mounted in housing 150, in a manner to be hereinafter described, and meshes with a worm wheel 154. As best shown in FIGURE 4 of the drawings, a shaft 156 is provided with an intermediate circular portion 158 provided with a keyway 160, a frusto-conically shaped portion 162, a circular one end portion 164 of reduced diameter provided with a square-shaped bore 166, a threaded portion 168 and a circular other end portion 170 provided with a square-shaped bore 172. The worm wheel 154 is provided with an internal bore having a circular bore portion 174 and a frusto-conically shaped bore portion 176. The bore portions 174 and 176 of the worm wheel slidably receive the shaft portions 158 and 162, and it can be seen that frictional engagement of shaft portion 162 with bore portion 176 provides a frictional drive clutch arrangement between the worm wheel 154 and shaft 156.

A washer 178 is provided with a lug 180 slidably received within keyway 160, with the washer bearing against one end of the worm wheel 154 and providing a seat for one end of a coil compression spring 182. A similar washer 184 provides a seat for the other end of spring 182, with washer 184 being axially located upon the shaft portion 158 by a hexagonal nut 186 threaded on shaft portion 168. Washer 184 is further provided with a lateral tab 188 which engages one face of the hexagonal nut 186 to prevent any unthreading of the nut along the shaft portion 168. It can be seen that the compression spring 182 biases the worm wheel 154 to the left to hold the bore portion 176 thereof in tight frictional engagement with the shaft portion 162 to provide the frictional drive clutch arrangement. However, it will be noted that whenever the torsional resistance of shaft 156 is greater than the drive torque of the worm wheel 154, the shaft 156 will remain stationary while the worm wheel 154 shifts slightly to the right against spring 182 and rotates relative to the shaft as the bore portion 176 of the worm rotates relative to the shaft portion 162.

The one end portion 164 of shaft 156 is rotatably supported and located by a shouldered bushing 190 which engages shaft portion 162. Bushing 190 is mounted within a bore 192 of reduced diameter in one end wall of housing 148, with the bushing being held in place against axially outward movement by peening over the edge portion 194 of the end wall after assembly. The other square-shaped end 198 of the flexible drive cable 119 is received within the square-shaped bore 166 to provide a drive connection between the shaft and cable. The cable 119 runs from the one end 164 of shaft 156 to the left hand rear jack 36 and is secured thereto as previously described. The other end of the sheath 120 is flared outwardly and engages the outer end of bushing 190. A cap 202 is provided with a pair of diametrically opposite inwardly extending tangs 204 which snap into longitudinal slots 206 in bushing 190 to secure the cap in place.

A shouldered bushing 207 is also provided to slidably receive the other end 170 of shaft 156, with one end of the bushing engaging a washer 208 which bears against a shoulder of the shaft between the other end 170 thereof and the threaded portion 168. Bushing 207 is received within a larger shouldered bushing 210 which fits within a shouldered bore 212 of the housing 148, with the end of the housing being peened over after assembly to fixedly secure bushing 210 to the housing. The square-shaped bore 172 of the other end portion 170 of the shaft receives the square-shaped end 214 of a drive cable 216. The drive cable 216 extends from the shaft to the right hand rear jack 36 and is secured to the jack in the same manner as cable 119 is secured to the left hand rear jack 36. A sheath 218 surrounds the cable 216, with the flared end of the sheath engaging the outer end of bushing 207 to locate this end of the sheath. A cap 220 is provided with a pair of diametrically opposite inwardly extending tangs 222 which engage within opposite diametrical longitudinally extending slots 224 of bushing 207 to secure the cap in place. The other end of sheath 218 together with a cap 220 are secured to the right hand rear jack 36 in the same manner as sheath 120 and cap 122 are secured to the left hand rear jack 36.

Figure 4A:
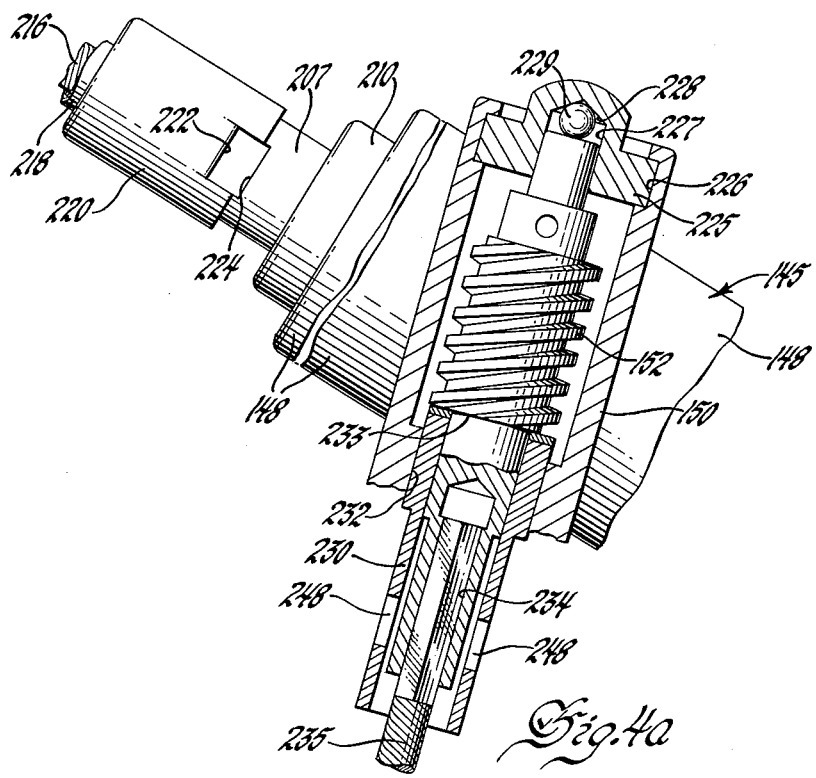
FIGURE 4a is an enlarged sectional view taken along the plane indicated by line 4a—4a of FIGURE 4.

Referring now particularly to FIGURE 4a, the manner in which worm 152 is mounted in housing 150 will be described. A bushing 225 is received within a bore portion 226 of larger diameter than the bore of housing 150 and is secured in place by peening over one end of the housing after assembly. Bushing 225 is provided with a circular bore 227 having a conical seat 228 for a ball bearing 229 which seats in seat 228 and engages the one end of the worm shaft which is rotatably received within bore 227. The other end of the worm shaft is mounted in a bushing 230 which is rotatably mounted within a bore portion 232 of smaller diameter than the bore of housing 150, with one end of the bushing engaging a shoulder 233 of the worm. Although not shown in the drawings, the other end of the bushing engages one end of the motor when housing 150 is secured thereto to hold the one end of the bushing in engagement with shoulder 233 and hold the one end of the worm shaft in engagement with the ball bearing 229. The other end of the worm shaft includes a square-shaped bore 234 which receives the square-shaped end 235 of the motor shaft to couple the motor shaft to the worm 152.

It can be seen that upon operation of the electric motor 144 in a particular direction, the rear pair of screw jacks 36 will be operated to either raise or lower the rear portion of the seat selectively and independently of any movement of the front portion of the seat. The flexible drive cables 119 and 216 allow the cables to be located forwardly beneath the seat so as to provide additional foot room for rear seat passengers while the sheaths 120 and 218 provide a protection for the cable and prevent the cable from whipping around underneath the seat. Since each of the drive cables is fixedly secured to the shaft 156, each of the screw jacks must operate in the same direction and must be adjusted through the same vertical distance whenever the motor 144 is operated. Should one of the screw jacks become obstructed or bind, the resultant torque overload from either cable 119 or 216, if greater than the torque driving force due to the frictional engagement between the shaft portion 162 and the bore portion 176, will cause the worm wheel 154 to rotate independently of the shaft so that any further adjustment of the other screw jack is stopped Thus, it is impossible to adjust one of the screw jacks independently of the other screw jacks so that there is no possibility of one rear side of the seat being higher or lower than the other rear side of the seat whereby the seat becomes tilted. This is a very desirable feature in seat adjusters employing screw jacks for vertical adjustment of the seat.

The front pair of screw jacks 36 are of the same construction as the rear pair of screw jacks 36 and are operated in substantially the same manner as will now be briefly described with reference to FIGURE 1 of the drawings. An electric motor 236 fits between the lower track 128 and bracket 20 at the right hand side of the seat and is located transverse of the right hand seat slide structure 109. The motor is mounted on bracket 20 by means of an angular mounting bracket 238 having one leg thereof secured to bracket 20 and the other leg thereof secured to one end of the motor. A torque overload coupling 240 is provided for the front pair of screw jacks 36, with this coupling being substantially the same as the hereinbefore described coupling 145 shown in FIGURES 4 and 4a except for certain minor differences. A flexible drive cable 241 having a sheath 242 interconnects one end of the shaft 156 of coupling 240 and the left hand front screw jack with the cable 241 and sheath 242 being the same as the cable 119 and sheath 120 and being secured to the shaft 156 and screw jack 36 in the same manner. Instead of coupling the other end of shaft 156 to the right hand front screw jack through a flexible drive cable similar to the cable 216, the square-shaped bore 172 of this other end of shaft 156 receives one end of a square-shaped drive rod, not shown, the other end of which is received by the square-shaped bore 117 of the worm 48 of the right hand front screw jack. In addition, the motor 236 is not directly connected with the worm 152 of coupling 240 but is rather connected thereto by a flexible cable and sheath assembly 244. This assembly 244 is the same as the previously described assembly 119, 120, and the drive cable of the assembly 244 is received within the square-shaped bore 234 of the shaft of worm 152, with the sheath of the assembly 244 engaging the end of bushing 230 and a cap 246 being provided with tangs which snap into opposite diametrically located slots 248 in the bushing. The motor shaft is provided with a square-shaped bore and the other end of the drive cable of assembly 244 fits within this bore. The sheath of assembly 244 engages the outer end of a bushing 250 for the motor shaft having slots which are the same as slots 248 to receive the tangs of a cap 252. The torque coupling 240 operates in the same maner as coupling 145, and it is believed that no further description need therefore be given.

From the previous description, it can be seen that each of the screw jacks 36 of the front transverse pair is pivotally connected to bracket 20 by bolts 38 for swinging movement about the same axis which is transverse of the seat and of the vehicle, and each is also pivotally secured by pins 138 to the front end of the lower tracks 128 of each of the slide structures for swinging movement about the same axis which is also transverse of the seat and vehicle. Each screw jack 36 of the rear pair is pivotally connected by bolts 40 to the bracket 20 for swinging movement about an axis which is longitudinal of the vehicle and of the seat and each is pivotally connected by pins 138 to the rear end of the lower tracks of the seat slide structures for swinging movement about the same axis which is transverse of the seat and of the vehicle. Thus, if the seat tends to shift longitudinally about the axes which are transverse of the seat and of the vehicle, this movement is prevented by the longitudinal axes of swinging movement of each of the screw jacks of the rear pair relative to the brackets 20. If the seat tends to shift laterally or transversely of the vehicle, this movement is prevented by the transverse axes of swinging of each pair of screw jacks relative to the seat slide structures and the transverse axes of swinging of the front pair of screw jacks relative to the support 20. Thus, the arrangement of the axes of swinging of the front and rear pairs of screw jacks effectively prevents both longitudinal and lateral seat sway.

As previously mentioned, horizontal adjustment of the seat is effected by screw jacks which are interconnected between the base supports and the upper tracks of each of the seat slide structures, with one of the screw jacks being directly driven by an electric motor and the other of the screw jacks being driven by the motor through a flexible drive cable arrangement. In the seat adjuster shown in the drawings, the upper track 126 of the left hand seat slide structure 109 is moved by the screw jack 254 which is directly driven by the drive motor 256 and this screw jack will now be described with reference particularly to FIGURE 8 of the drawings.

An internally threaded nut 258 is received within one end of a tube 260 and is secured therein by bending over the edge 261 of the tube and welding or brazing this edge to the nut. The other end of tube 260 receives a circular lug 262 of a block member 264, with the block member being secured to the tube by a rivet 266. An angle bracket 268, FIGURES 1 and 6, has one leg 270 thereof secured to bracket 20 by the inboard left hand rear bolt 35. Block 264 is bolted at 272 to the other leg 271 of bracket 268 to secure the block thereto, with a conical coil compression spring 274 being provided between the block 264 and leg 271 of the bracket to provide a rattle free pivotal connection.

Tube 260 is received within a tube 276 of larger diameter which is secured to a housing member 278 by fitting the flared end 279 of the tube into a similarly shaped circular groove in the housing member. The outer race of a thrust bearing 280 is received within a shouldered bore 282 of housing member 278 and is secured therein by peening over a portion of the wall of the bore after assembly. A lead screw 286 is threadedly received by nut 258 and is provided with opposite end shafts 286 and 288, with shaft 288 having a keyway 290. A circular washer 292 is slidably received on shaft 286 and is located against axially outwardly sliding movement by a split ring 294 which snaps into a groove 296 in shaft 286. The shaft 288 of the lead screw is rotatably supported by the inner race of the thrust bearing 280. A worm wheel 298 is provided with a key 300 which is slidably received within keyway 290 to secure the worm wheel to the lead screw for rotation therewith, with a washer 302 being provided between the worm wheel and the inner race of the thrust bearing. A nut 303 is threaded on a threaded portion 304 of shaft 288 to hold the worm wheel and washer 302 in tight relationship against one side of the inner race of the thrust bearing and to hold a shoulder 306 of the lead screw in tight engagement against the other side of the inner race of the thrust bearing whereby the worm wheel, the washer and the inner race of the thrust bearing rotate with the lead screw.

The worm wheel 298 meshes with a worm 308 which is rotatably mounted within a linear boss 310 of housing member 278 in a manner now described in conjunction with FIGURE 9. A bushing 312 is received within a shouldered bore 314 of boss 310 and is secured in place by peening over one end of the boss after assembly. The bushing is provided with a bore 316 having a conical seat 318 in the base wall thereof which seats a ball bearing 320. An end shaft 322 of worm 308 is rotatably received within bore 316 in engagement with the ball bearing 320 to provide a thrust bearing for the worm. A bushing 324 is received within a shouldered bore 326 of boss 310 in engagement with a shoulder 328 of worm 308, with the bushing being secured in place after assembly by peening over the end of the boss. The bushing 324 rotatably supports the other end shaft 329 of the worm.

Referring now to FIGURE 8 of the drawings, an end cap 330 is provided for housing member 278, with the housing member fitting within a groove 331 of the cap and being secured thereto by a number of bolts 332 which extend between the housing member and the cap 330. Cap 330 is provided with a bore 333 to receive the end of shaft 288 and an apertured lug 334. As seen best in FIGURE 3 of the drawings, a bracket 336 includes a generally C-shaped leg 338 which surrounds the upper track 126 adjacent the forward end thereof and is secured thereto as by welding or brazing. The other leg 340 of the bracket is apertured and is bolted at 342 to to lug 334, with a conical compression spring 343 being provided between a washer 344 and lug 334 to again provide a rattle free assembly. Thus, screw jack 254 is secured between the bracket 20 and the upper track 126 of slide structure 109.

As best shown in FIGURES 1, 8 and 9, a bracket 346 has one leg 348 thereof secured by rivets or bolts 350 to one of the side walls of housing member 278. The other leg 352 of the bracket is bolted at 354 to one of the end walls of motor 256. A torsional rubber drive coupling 356 interconnects one end of the motor drive shaft 358 and the end shaft 329 of worm 308 to provide a drive connection between the motor and the worm.

The right hand horizontal screw jack 254 is substantially the same as the left hand screw jack 254 and is secured to the right hand bracket 20 and the upper track 126 of the right hand seat adjuster 109 in the same manner as the left hand screw jack previously described. However, it will be remembered that the right hand screw jack is not directly driven by the motor 256, but is rather driven through a flexible drive cable arrangement which interconnects the screw jack with the motor. Referring now particularly to FIGURE 10 of the drawings, the connection of the drive cable arrangement to the right hand screw jack will be described. The bushing 324 of the right hand screw jack is provided with an extension 359 which receives the end shaft 329 of the worm 308. This shaft 329 is provided with a square-shaped bore 360 which receives one square-shaped end 362 of the drive cable 364. The drive cable is provided with a protective sheath 368, with one flared end of this sheath engaging the end of extension 359 and a protective cap 370 surrounding the flared end of the sheath and being provided with opposite diametrically located tangs 372 which snap into slot 374 of the extension. The other end of the motor drive shaft 358 of motor 256, not shown, is provided with a square-shaped bore similar to bore 360 which receives the other square-shaped end 362, not shown, of cable 364 to secure the cable to the motor shaft. The bushing 376, FIGURE 1, for the other end of shaft 358 is provided with slots, not shown, similar to slots 374 which receive opposite tangs, not shown, of a cap 378 fitting over the other flared end of sheath 368 and engaging bushing 376.

Since the electric motor 256 is connected with both the left hand and right hand screw jacks 254, operation of the motor to drive the screw jacks will effect horizontal adjustment of the seat, as will now be described. Upon operation of the electric motor to drive the worms 308, the worms 308 will drive the worm wheels 298 in the desired direction. This in turn will rotate the lead screws 284 to thread the nuts 258 into and out of the lead screws so that the tubes 260 will either be extended or retracted with respect to the tubes 276. Since one end of each of the screw jacks is connected to the brackets 20 through the brackets 268, while the other end of each of the screw jacks is connected to each of the upper tracks 126 through the brackets 336, extension of the screw jacks will cause the upper tracks 126 to move forwardly or to the left, as viewed in FIGURE 1 of the lower tracks to effect horizontal forward adjustment of the seat and retraction of each of the screw jacks will cause the upper tracks 126 to move rearwardly or to the right, as viewed in FIGURE 1, of the lower tracks to effect horizontal rearward adjustment of the seat.

Since the pair of front transverse screw jacks 36, the pair of rear transverse screw jacks 36 and the pair of horizontal adjustment screw jacks 254 are each driven by a separate electric motor, it can be seen that horizontal adjustment of the seat may be effected selectively and independently of any vertical adjustment of the seat, and that vertical adjustment of the front and rear portions of the seat may be effected selectively and independently of each other and also of horizontal adjustment of the seat.

As shown schematically in FIGURE 2 of the drawings, a vehicle seat 380 may be mounted in a frame 382 which is secured to each of the upper tracks 126 of the seat slide structures 109 by bolts 384, FIGURE 1.

As best shown in FIGURE 6 of the drawings, each of the screw jacks 36 extends through an opening 43 in the vehicle floor pan 32. It is desirable to seal these openings to prevent the entry of dirt and dust from beneath the vehicle, and therefore a rubber washer 390, FIGURE 2, fits around the housing 42 of each screw jack of the front pair in engagement with housing 44 and is compressed therebetween and the floor pan 32 when the front ends of the brackets 20 are secured to the floor pan by bolts 35. The rear pair of screw jacks do not extend as far below the level of the floor pan 32 as do the front pair, and therefore a circular bushing 394 is provided between rubber washers 390 and the housings 44 of the rear screw jacks to compress these washers against the floor pan 32 around the openings 43 when the rear ends of the brackets 20 are secured to the floor pan by bolts 35. Of course the openings 43 are large enough to permit whatever swinging movement of the screw jacks relative to the brackets 20 and the floor pan 32 is necessary during vertical adjustment of the seat.

Upon reference to FIGURE 2 of the drawings, it will be noted that each of the legs 271 of the brackets 268 is provided with an aperture 395 located rearwardly of the aperture therein which receives bolt 272. By providing the apertures 395, each of the screw jack assemblies 254, together with the upper tracks 126 of the seat slide structures 109, can be moved rearwardly, if necessary, to provide additional foot room for the driver should the rearmost position of the upper tracks relative to the lower tracks not provide enough foot room when the screw jacks 254 are bolted to the apertures forwardly of apertures 395. This is a desirable feature in seat adjusters since it allows horizontal adjustment of the power actuating means and upper tracks relative to the lower tracks and vertical adjusting means between two predetermined limit position defined by the apertures 395 and the apertures forwardly thereof.

Thus, this invention provides a new and improved vehicle seat adjusting means which is operative to effect both horizontal and vertical adjustment of a vehicle seat.

What is claimed is:

1. A vehicle seat adjusting mechanism comprising, a base support, a seat support, and a spaced pair of seat adjusting means, each pivotally secured to said base support and to said seat support, the pair of pivotal axes of one of said adjusting means being located in spaced parallel relationship and the pair of pivotal axes of the other of said seat adjusting means being located in spaced normal relationship, said adjusting means thereby mutually limiting swinging movement of each other relative to said base support and said seat support.

2. A vehicle seat adjusting mechanism comprising, a base support, a seat support, and a spaced pair of adjustable screw jacks, each pivotally secured to said base support and to said seat support, the pair of pivotal axes of one of said screw jacks being located in spaced parallel relationship and the pair of pivotal axes of the other of said screw jacks being located in spaced normal relationship.

3. A vehicle seat adjusting mechanism comprising, a base support, a seat support, and a spaced pair of adjustable screw jacks, each pivotally secured to said base support and to said seat support, the pivotal axes of said screw jacks relative to one of said supports being located in parallel relationship with respect to each other and the pivotal axes of said screw jacks relative to the other of said supports being located in normal relationship with respect to each other.

4. A vehicle seat adjusting mechanism comprising, a base support, a seat support, and a spaced pair of adjustable screw jacks, each pivotally secured to said base support and to said seat support, the pivotal axes of said screw jacks relative to said seat support being located in parallel spaced relationship with respect to each other and the pivotal axes of said screw jacks relative to said base support being located in normal relationship with respect to each other.

5. A vehicle seat adjusting mechanism comprising, a base support, a spaced pair of longitudinally extending seat supports, and transversely spaced pairs of adjustable screw jacks, each pivotally secured to said base support and to one of said seat supports, each pair of pivotal axes of one of said transverse pairs being transversely axially aligned, with one pair of pivotal axes of the other of said transverse pairs being transversely axially aligned and the other pair of pivotal axes of the other of said transverse pairs being located in parallel relationship.

6. A vehicle seat adjusting mechanism comprising, a base support, a spaced pair of longitudinally extending seat supports, a transversely spaced pair of adjustable screw jacks, each pivotally secured to said base support and to one of said seat supports, means for adjusting said screw jacks, driven means operatively and rigidly interconnecting said means for adjusting said screw jacks, power operating means for driving said driven means, and torque limiting means operatively interconnecting said power operating means and driven means to insure simultaneous adjustment of said screw jacks.

7. A vehicle seat adjusting mechanism comprising, a base support, a spaced pair of longitudinally extending seat supports, a transversely spaced pair of adjustable screw jacks, each pivotally secured to said base support and to one of said seat suppports, means for adjusting said screw jacks, driven means operatively and rigidly interconnecting said means for adjusting said screw jacks, power operating means for driving said driven means, and torque limiting means including frictional drive clutch means for operatively interconnecting said power operating means with said driven means to insure simultaneous adjustment of said screw jacks.

8. A vehicle seat adjusting mechanism comprising, a base support, a spaced pair of longitudinally extending seat supports, a transversely spaced pair of adjustable screw jacks, each pivotally secured to the base support into one of said seat supports, torque limiting means including a driven clutch member and a driving clutch member frictionally engageable with said driven member within predetermined torque limits, power operating means for driving said driving clutch member, and a flexible cable operatively connecting said driven clutch member with each of said screw jacks for simultaneous adjustment thereof upon operation of said power operating means.

9. In a vehicle seat adjusting mechanism, the combination comprising, a housing member, a nut member within said housing member, thrust bearing means seated on said housing and nut members to locate said nut member within said housing member, a lead screw member threadedly received by said nut member, a seat support member pivotally secured to said lead screw member for swinging movement relative thereto and said housing member, resilient means seated on said housing member, and cam means on said seat support member engageable by said resilient means to provide a constant biasing force on said support member regardless of the rotative position of said seat support and housing members.

10. In a vehicle seat adjusting mechanism, the combination comprising, a generally upright housing member, a nut member within said housing member, thrust bearing means seated on said housing and nut members to locate said nut member within said housing member and receive axial thrust therefrom, a lead screw member threadedly received by said nut member, gear drive means for rotating said nut member to move said lead screw member axially relative thereto, a seat support member pivotally secured to said lead screw member, resilient means seated on said housing member, and arcuate cam means on said seat support member engageable with said resilient means to provide a constant biasing force on said seat support member regardless of the rotative position of said seat support and lead screw members.

11. A vehicle seat adjusting mechanism comprising, a base support, a seat support, seat adjusting means pivotally secured to said base support and to said seat support, means on one of said supports having an arcuate cam surface, the center of said cam surface being at the pivotal connection between said adjusting means and said one of said supports, and means on said adjusting means engageable with said cam surface to provide a constant biasing force on said one of said supports regardless of the rotative position of said one of said supports relative to said adjusting means.

References Cited in the file of this patent

UNITED STATES PATENTS

| | | |
|---|---|---|
| 804,778 | Smith | Nov. 14, 1905 |
| 1,407,160 | Klausmeyer | Feb. 21, 1922 |
| 1,730,252 | Temple | Oct. 1, 1929 |
| 2,530,796 | Weyant | Nov. 21, 1950 |
| 2,555,804 | McCarthy | June 5, 1951 |
| 2,599,292 | Steinbach | June 3, 1952 |
| 2,608,239 | Gorden | Aug. 26, 1952 |
| 2,672,378 | McVey | Mar. 16, 1954 |
| 2,707,137 | Hollstein | Apr. 26, 1955 |
| 2,765,024 | Brundage | Oct. 2, 1956 |
| 2,780,501 | Rosenberg | Feb. 5, 1957 |
| 2,783,826 | Haltenberger | Mar. 5, 1957 |
| 2,809,689 | Garvey et al. | Oct. 15, 1957 |
| 2,834,396 | Herider | May 13, 1958 |
| 2,875,809 | Ragsdale | Mar. 3, 1959 |